US009472036B2

(12) United States Patent
Rouchouze et al.

(10) Patent No.: US 9,472,036 B2
(45) Date of Patent: Oct. 18, 2016

(54) METHOD FOR VERIFYING DOCUMENTS AND DEVICE IMPLEMENTING SUCH A METHOD

(71) Applicant: GEMALTO SA, Meudon (FR)

(72) Inventors: Bruno Rouchouze, Meudon (FR); Mourad Faher, Meudon (FR); Francois Perticara, Meudon (FR); Guennole Tripotin, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/382,354

(22) PCT Filed: Mar. 1, 2013

(86) PCT No.: PCT/EP2013/054214
§ 371 (c)(1),
(2) Date: Sep. 2, 2014

(87) PCT Pub. No.: WO2013/128019
PCT Pub. Date: Sep. 6, 2013

(65) Prior Publication Data
US 2015/0034716 A1    Feb. 5, 2015

(30) Foreign Application Priority Data
Mar. 1, 2012  (EP) ................................. 12305250

(51) Int. Cl.
*G06K 5/00* (2006.01)
*G07C 11/00* (2006.01)
(Continued)

(52) U.S. Cl.
CPC ............. *G07C 11/00* (2013.01); *G02B 27/017* (2013.01); *G02C 11/10* (2013.01); *G06K 5/00* (2013.01);
(Continued)

(58) Field of Classification Search
CPC ............. G06K 17/00; G06K 7/10693; G06K 7/10881; G06K 7/10871; G06Q 30/02; G06Q 20/341; G07F 7/1008
USPC ............... 235/375, 380, 382, 462.13, 462.35
See application file for complete search history.

(56) References Cited

U.S. PATENT DOCUMENTS

| 7,837,124 B2 * | 11/2010 | Huot ................. G06K 19/025 235/380 |
| 2006/0115130 A1 | 6/2006 | Kozlay |
| 2006/0179481 A1 * | 8/2006 | D'Agnolo ....................... 726/20 |
| 2008/0316605 A1 * | 12/2008 | Hazell et al. ................. 359/630 |

FOREIGN PATENT DOCUMENTS

| GB | 2425874 A | 11/2006 |
| WO | WO01/06298 A1 | 1/2001 |
| WO | WO2004/017265 A1 | 2/2004 |

OTHER PUBLICATIONS

Fersca, A. et al: "Wearable Displays for Everyone!", IEEE Pervasive Computing, IEEE Service Center, Los Alamitos, CA, US, vol. 9, No. 1, Jan. 1, 2010-Mar. 31, 2010, pp. 7-10, XP011298896, ISSN: 1536-1268 the whole document.
(Continued)

*Primary Examiner* — Karl D Frech
(74) *Attorney, Agent, or Firm* — The Jansson Firm; Pehr B. Jansson

(57) ABSTRACT

This invention relates to a method used by an authorized user for the verification of a document having electronic verification means, The method comprises the various steps consisting in:—reading, with electronic reading equipment with which the authorized user is equipped, of information stored in the electronic verification means of the verified document;—transferring verification information, established on the basis of the information saved in the electronic verification means, from the electronic reading equipment to a viewing device of the authorized user, which viewing device is positioned, in normal conditions of use, in front of the eyes of the authorized user, the said viewing device being transparent to allow the said authorized user to see through it.

14 Claims, 1 Drawing Sheet

(51) Int. Cl.
   *G07D 7/00*     (2016.01)
   *G02B 27/01*    (2006.01)
   *G07C 9/00*     (2006.01)
   *G02C 11/00*    (2006.01)

(52) U.S. Cl.
   CPC ......... *G07C 9/00079* (2013.01); *G07D 7/0093* (2013.01); *G02B 2027/014* (2013.01); *G02B 2027/0178* (2013.01); *G07C 9/00087* (2013.01)

(56) References Cited

OTHER PUBLICATIONS

PCT/EP2013/054214, International Search Report, Apr. 10, 2013, European Patent Office, P.B. 5818 Patentlaan 2 NL—2280 HV Rijswijk.

PCT/EP2013/054214, International Search Report, Apr. 10, 2013, European Patent Office, D-80298 Munich.

* cited by examiner

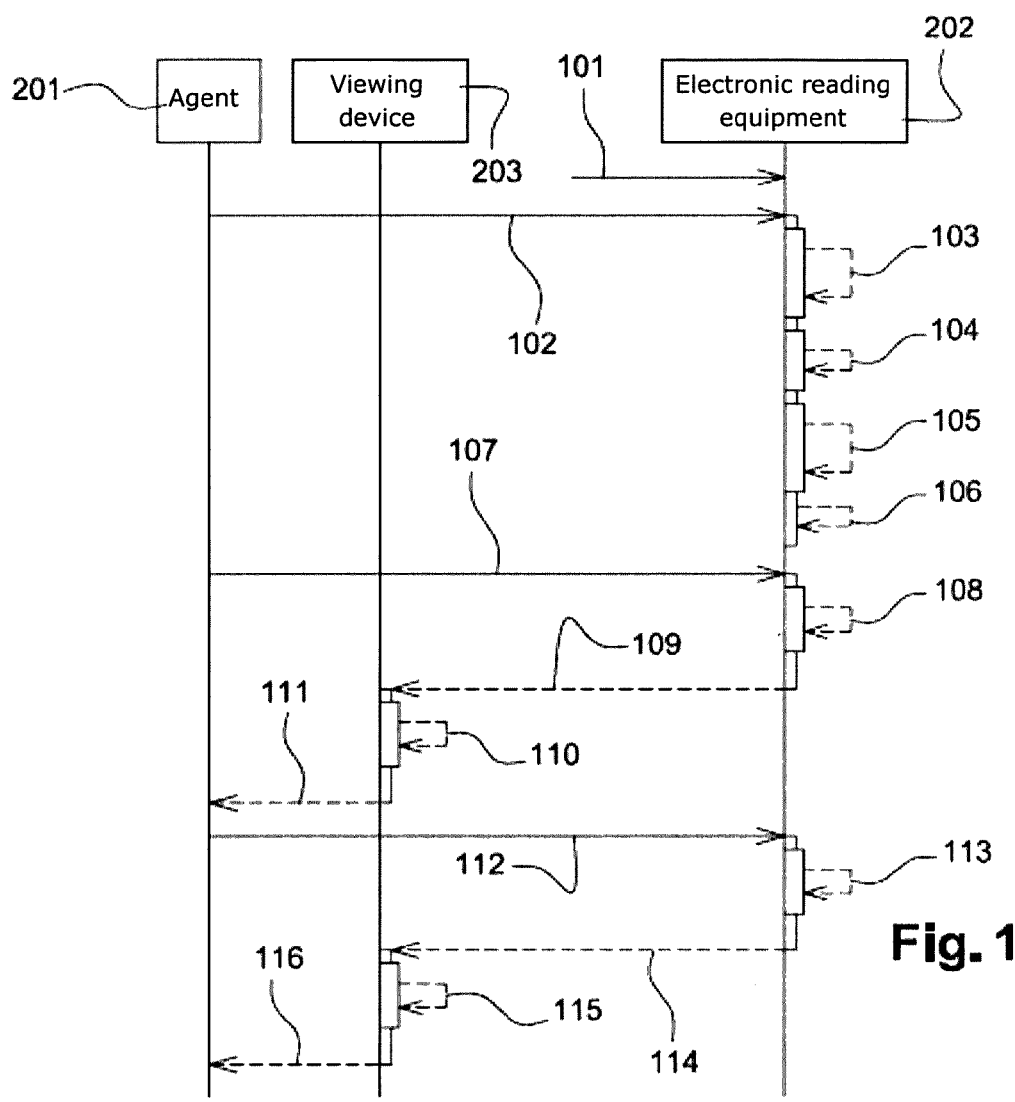
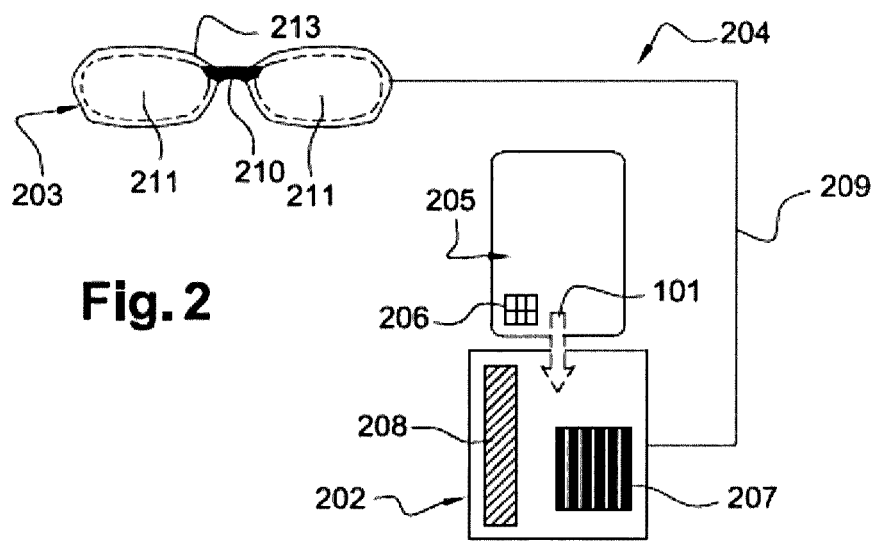

METHOD FOR VERIFYING DOCUMENTS AND DEVICE IMPLEMENTING SUCH A METHOD

TECHNICAL FIELD OF THE INVENTION

The invention relates to a method for verifying documents, particularly sensitive documents. It also relates to a device capable of implementing such a verification method.

The field of the invention is generally that of the verification of the authenticity of certain documents comprising electronic verification means, particularly so-called sensitive documents. Sensitive documents essentially means documents issued by the governmental agencies of a country, which are official documents, particularly relating to the identity of individuals. Thus for example, an identification card, a passport, a driving license or a resident's permit are sensitive documents. Electronic verification means are currently often present in such documents, essentially in the most recent documents. The electronic verification means present on such documents are mostly of the electronic chip type, but they may also be made up of any kind of medium (for example a magnetic stripe) that is capable of saving information that can be accessed by electronic reading means.

TECHNOLOGICAL BACKGROUND OF THE INVENTION

Today, there are different devices that are capable of verifying the authenticity of certain sensitive documents comprising electronic verification means. Such devices are typically devices comprising reading means, electronic verification means, and means to send back verification information, which most often merely indicates whether or not the verified document is authentic. The verification information is most often sent back on a control screen, or with a simple luminous indicator (where one colour indicates that the verified document is authentic, and another colour indicates that the verified document is not authentic).

When an agent is carrying out an identification check, existing devices using the state of the art do not offer optimum security, because in order to become aware of the verification information, the agent must necessarily look away from the person undergoing the check. Such a lack of surveillance, however temporary, may be risky if the person undergoing the check is dangerous.

That is why it is necessary, for the agents responsible for such checks to be safer, to improve the existing verification devices.

SUMMARY OF THE INVENTION

One of the objects of this invention is to provide a solution to the problem that has just been described. To that end, in the invention, a method and a device are proposed thanks to which an agent verifying documents, particularly sensitive documents comprising electronic verification means, can keep their eye on the person undergoing the check, while visually accessing the verification information generated from the data contained in the verified document. Thus, in the invention, information is presented to an authorised user on a medium through which the authorised user can look; in that way the user can look at the person undergoing the check and the verification information simultaneously. Advantageously, different security levels are provided for the transfer of information within the device according to the invention, particularly in order to prevent any attempt by unauthorised parties to retrieve data.

The invention thus essentially relates to a method for the verification, by an authorised user, of a document comprising electronic verification means The method comprises the different steps consisting in:
  reading, with electronic reading equipment with which the authorised user is equipped, information stored in the electronic verification means of the verified document;
  transferring verification information, established on the basis of the information saved in the electronic verification means, from the electronic reading equipment to a viewing device of the authorised user, which viewing device is positioned, in normal conditions of use, in front of the eyes of the authorised user, the said viewing device (203) being transparent to allow the said authorised user to see through it.

In addition to the main characteristics that have been mentioned above, the method according to the invention can advantageously comprise one or more supplementary characteristics out of the following, taken individually or in any technically achievable combination:
  the step of the transfer of verification information is achieved from the electronic equipment to at least one viewing screen integrated in a lens of a pair of spectacles worn by the authorised user.
  the method comprises a supplementary step consisting, prior to the transfer of verification information, in securely connecting the viewing device to the electronic reading equipment.
  the method comprises supplementary steps consisting in:
  prior to the step of the transfer of verification information,
    encrypting the verification information in the electronic reading equipment to generate encrypted verification information;
  decrypting, with decrypting means integrated in the viewing device, the encrypted verification information to obtain the verification information established from the information saved in the electronic verification means of the verified document.
  the method comprises a supplementary step consisting in, prior to the reading of the information saved in the electronic verification means, verifying the validity of the document to verify with the verification means integrated in the electronic reading equipment.
  the method comprises a supplementary step consisting in, prior to the reading of the information saved in the electronic verification means, verifying the identity of the authorised user.
  the method comprises a supplementary step consisting in the triggering, by the authorised user, of the transfer of verification information by means of an information display verification device integrated in the electronic reading equipment.
  the method comprises a supplementary step consisting in pairing up the electronic reading equipment and the viewing device.

This invention also relates to a device, with which the authorised user is equipped, for the verification of a document comprising electronic verification means. The said device comprises the following:
  electronic equipment to read the information saved in the electronic verification means of the document to verify;
  a transparent viewing device placed in front of the eyes of the authorised user in normal conditions of use;
  means to transfer verification information established from the information saved in the electronic verification means from the electronic reading device to the viewing equipment of the authorised user.

The viewing device is transparent, so the authorised user is able to simultaneously view the person undergoing the check and the verification information.

In addition to the main characteristics that have been mentioned above, the device according to the invention can advantageously comprise one or more supplementary characteristics out of the following, taken individually or in any technically achievable combination:

the viewing device is integrated into a pair of spectacles.

the transfer means comprise a shielded wired connection connecting the viewing device to the electronic reading equipment.

the electronic reading equipment comprises means to verify the display of information on the viewing device.

the means to verify the display of information on the viewing device include a capacitive scrolling bar, particularly placed on an accessible side of the electronic reading equipment.

the device comprises identification means, particularly placed on an accessible side of the electronic reading equipment, of the authorised user.

The invention and its different applications will become easier to understand in the description below and the figures accompanying it.

BRIEF DESCRIPTION OF FIGURES

The figures are presented for information only and are not limitative in any way.

The figures illustrate the following:

FIG. 1 is a schematic representation of a succession of operations that occur within the device according to the invention in an example of the implementation of the method according to the invention;

the single FIG. 2 is a schematic illustration of a schematic representation of an example of embodiment of the device according to the invention.

DETAILED DESCRIPTION OF AT LEAST ONE EMBODIMENT OF THE INVENTION

Unless otherwise specified, an element featuring in several figures will have the same reference.

FIG. 1 represents a succession of steps of operations occurring in an example of implementation of the method according to the invention. FIG. 1 is described jointly with FIG. 2, which shows an example of a device according to the invention capable of implementing the method described in FIG. 1.

The operations described in FIG. 1 are operations that occur between three main entities: an agent 201, who is an authorised user of a device 204 for verifying documents according to the invention; electronic reading equipment 202 with which the agent 201 is equipped, and a viewing device 203. The viewing device 203 and the electronic reading equipment 202 belong to the document verification device 204.

A first step 101 of the method according to the invention consists in inserting a document 205 into a reader of the electronic reading equipment 202. The document 205 is typically a sensitive document comprising electronic verification means 206 that contain a certain number of pieces of information, which may be confidential. In the represented example, the electronic verification means 206 are an electronic chip or integrated circuit, with a contact type and/or contactless communication interface. The document 205 is for example, without limitation, an identification card, a passport, a driving license, a resident's permit etc.

In an advantageous example of the embodiment of the device 204, the electronic reading equipment 202 comprises a means 207 for authenticating the agent 201. Typically the authenticating means 207 is a strong authentication means, of the type biometric sensor, which is capable of identifying an authorised user by recognising their fingerprint.

Thus, in a step 102 of the method according to the invention, the agent 201 is identified by means of the authentication means 207, for example by placing one of their fingers on the authentication means 207. In practice, several agents are likely to be authorised to use the same electronic reading equipment 202.

Then, in a step 103, an operation consisting in verifying the identity of the agent 201 is carried out. That operation may for example be carried out by means of a microprocessor of the authentication means 207, which manages the comparisons between the biometric data retrieved by the authentication means 207 and the data saved in a memory module of the electronic reading equipment 202. In some modes of implementation of the method according to the invention, the step 101 of inserting a document 205 in the reader may occur after the identification and verification steps 102 and 103.

If the verification of the identity of the agent 201 leads to the conclusion that the agent 201 is indeed an authorised user of the electronic reading equipment 202, an operation 104 of authenticating the document 205 is carried out, also within the electronic reading equipment 202, to determine if the document is not a fake; verification means, for example specific data, may be saved in the electronic verification means 206 for that purpose. As an example, this may be achieved by optical means present in the equipment 202 to verify the authenticity of the document 205. Advantageously, an optical verification operation of the body of the document 205 is carried out, followed by a software verification where the data obtained during the optical verification (document scanned for example) are compared with the data saved in the electronic verification means 206, the said saved data being dependent on the data present in the body of the document. An example of the implementation of such verification has been described in the document WO 2006/038075.

Prior to the authentication operation 104, in some modes of implementation, a supplementary verification may be carried out by asking the person undergoing the check to enter a code, typically a PIN number, into the electronic reading equipment 202. The PACE protocol is then executed between the reader of the electronic reading equipment 202 and the electronic verification means 206 to verify if the PIN number entered is correct. The supplementary verification is only applied in some modes of implementation of the invention. That supplementary verification must not prevent the agent 201 from verifying the electronic content of the document, in order to cover the possibility of non-cooperation by the person undergoing the check, which non-cooperation may be voluntary if they are reluctant and involuntary if they do not have full command of their faculties.

If the document 205 passes the authentication operation 104, in the illustrated mode of implementation, a reading operation 105 is carried out using the reader of the electronic reading equipment 202, of the information saved in the electronic verification means 206 of the document 205.

The authentication 104 and reading 105 operations are advantageously carried out within the equipment 102, with no exchange outside the equipment 102. Local verification means can thus be used. In that way, the possibility of the information exchanged between the electronic verification means 206 and the reader of the electronic reading equipment 202 being intercepted by an outside party is limited, even if the exchange takes place without contact.

The information read in the reading operation 105 is information relating to the nature of the verified document: thus, in the case of an identification card, the information read relates to the identity of the person undergoing the check, providing it is their identification card, for example information encoding an image of the photograph of the person undergoing the check. The information read make it possible to generate at least one piece of verification information designed to be sent to the viewing device 203.

Then a step 106 is carried out, consisting in transmitting validation information sent by the electronic reading equipment 202 to inform the agent 201 whether or not the information was read successfully, during the reading operation 105. The validation information may for example be an audio signal, the intensity or tone of which could vary depending on whether the operation 105 is successful or not. In some modes of embodiment of the method according to the invention, the validation information only indicates that the document 205 is a document that could not be verified, independently of the consideration of the detection of the inauthenticity of the document 205; that is typically the case if the chip of the document 205 does not respond.

When the agent 201 becomes aware that the reading operation 105 has succeeded, they then trigger the transfer of the verification information generated in the course of the operation 105 to the viewing device 203. To that end, the agent 201 triggers the operation by an action 107 on the electronic reading equipment 202, advantageously fastened to their waist, for example on a belt, by action on a device 208 for verifying the display of information. The device 208 is a means that allows the agent 201 to manage, simply and intuitively, by making it possible to continue to monitor the person undergoing the check, the transmission of information to the viewing device 203 from the electronic verification equipment 202; it may for example be a capacitive scrolling bar placed on a directly accessible side of the electronic reading equipment 202. In other examples of embodiment, the display verification device is not placed on the electronic reading equipment 202; it may thus for example be placed on the clothes of the agent 201 or even on the viewing device 203. Advantageously, regardless of the location of the display verification device 208, it must be easily accessible for the agent 201, who must advantageously be able to access it directly using only one hand. Depending on the examples of embodiment, it may take a form other than that of a capacitive scrolling bar: for example, it may consist in one of more contact buttons of the pushbutton type.

The agent 201 can thus control the device 208 with only one hand, keeping their other hand free to react to movements by the person undergoing the check, for example by seizing a weapon.

Once the agent 201 has controlled the device 208, an operation 108 is carried out to encrypt the first piece of verification information, which may for example consist in a first piece of identity information, out of the verification information generated during the operation 105. The first piece of encrypted verification information is then transmitted automatically in a first transmission operation 109 from the electronic reading equipment 202 to the viewing device 203.

Depending on the modes of implementation, transmission 109 may be carried out in wired or wireless mode. However, advantageously, the electronic reading equipment 202 is connected to the viewing device 203 by means of a shielded wired connection 209 so that no transmitted information can be intercepted fraudulently. The shielded wired connection 209 thus allows the passing of a bus connecting a microcontroller of the electronic reading equipment 202 and a microcontroller 210 integrated into the viewing device 203.

The first piece of encrypted verification information is then decrypted in an operation 110 by means of a decrypting application, the working of which is managed by a microcontroller 210 of the viewing device 203. Then, in a step 111, the first piece of verification information is displayed on the viewing device 203.

In the invention, the viewing device 203 is placed, in normal conditions of use, in front of the eyes of the authorised user 201. Thus, the viewing device may comprise at least one viewing screen 211 integrated in a lens 212 of spectacles 213 worn by the agent 201. Thus, in the invention, the viewing device 203 comprises viewing screens 211 and the microcontroller 213.

In the invention, OLED (Organic Light Emitting Diode) technology is used for making the viewing screen or screens. Their working is controlled by the microcontroller 213, which advantageously receives data relating to the making an interface of the GUI type that manages the display of verification information on the viewing display 203 from the reading electronic equipment 202.

The expression 'normal conditions of use' means a situation in which the authorised user 201 is on duty and checking a person; the agent has placed the viewing device 203 (and thus, in the illustrated example, the spectacles 213 when the viewing device 203 is integrated into the said spectacles 213) in a position predefined by the manufacturer of the viewing device 203. The agent 201 can thus, because of the transparent character of the viewing device, simultaneously view one or more pieces of verification information, for example a photograph of the person undergoing the check, while keeping their eyes on the person undergoing the check.

The action operations 107 by the agent on the electronic reading equipment, encryption 108, transmission 109, decryption 110 and display 111 may be repeated as illustrated, respectively by similar operations 112, 113, 114, 115 and 116 to view the next piece of verification information.

Advantageously, in the invention, the electronic equipment 202 and the viewing device 203 are paired up, for example while manufacturing the device according to the invention: pairing may thus reside in storing special codes in the microcontrollers of the electronic equipment 202 and of the viewing device 203, which, when they are connected by a wired connection 209, are compared to determine their ability to exchange information.

The invention claimed is:

1. A method for the verification, by an authorised user, of a document having a chip presented by a person undergoing an identification check, comprising:

reading, with electronic reading equipment with which the authorised user is equipped, verification information stored in the chip of the verified document that are related to the identity, such as information encoding an image of a photograph, of the person undergoing the check;

transferring verification information, established on the basis of the information saved in the chip, from the electronic reading equipment to a viewing device of the authorised user, which viewing device is positioned, in normal conditions of use, in front of the eyes of the authorised user, the said viewing device being transparent to allow the said authorised user to see through the viewing device, thereby allowing the authorized user to keep eyes on the person undergoing the check, while visually accessing the verification information generated from the data contained in the verified document.

2. The method according to claim 1 wherein the step of the transfer of the verification information is carried out from the electronic reading equipment to at least one viewing screen integrated into a lens of a pair of spectacles worn by the authorised user.

3. The method according to claim 1 wherein the said method further comprises, prior to the step of the transfer of the verification information, securely connecting the viewing device to the electronic reading equipment.

4. The method according to claim 1 wherein the said method further comprises:
   prior to the step of the transfer of verification information, encrypting the verification information in the electronic reading equipment to generate encrypted verification information;
   decrypting, with decrypting means integrated in the viewing device, the encrypted verification information to obtain the verification information established from the information saved in the chip of the verified document.

5. The method according to claim 1 wherein the said method further comprises, prior to the step of the reading of the information stored in the chip, verifying with the chip integrated in the electronic reading equipment, the validity of the document to verify.

6. The method according to claim 1 wherein the said method further comprises, prior to the step of the reading of the information saved in the chip, verifying the identity of the authorised user.

7. The method according to claim 1 wherein the said method further comprises triggering, by the authorised user, of the operation for the transfer of verification information, by means of a device to verify the display of the information integrated into the electronic reading equipment.

8. The method according to claim 1 wherein the said method further comprises pairing up the electronic reading equipment and the viewing device.

9. The device according to claim 8 wherein the electronic reading equipment comprises means to verify the display of the information on the viewing device.

10. The device according to claim 8 wherein the means for verifying the display of information on the viewing device comprise a capacitive scrolling bar, particularly placed on an accessible side of the electronic reading equipment.

11. The device according to claim 8, further comprising means for the identification, particularly placed on an accessible side of the electronic reading equipment, of the authorised user.

12. A device, with which an authorised user is equipped, for the verification of a document having a chip, the said device comprising:
   electronic equipment to read verification information saved in the chip of the document to allow verification based on the information, the verification information being related to the identity, such as information encoding an image of a photograph, of the person undergoing the check;
   a transparent viewing device placed in front of the eyes of the authorised user in normal conditions of use;
   means to transfer verification information established from the information saved in the chip from the electronic reading equipment to the transparent viewing device of the authorised user, thereby allowing the authorized user to keep eyes on the person undergoing the check, while visually accessing the verification information generated from the data contained in the verified document.

13. The device according to claim 12 wherein the viewing device is integrated in a pair of spectacles.

14. The device according to claim 12 wherein the transfer means comprise a shielded wired connection between the viewing device and the electronic reading equipment.

* * * * *